United States Patent Office

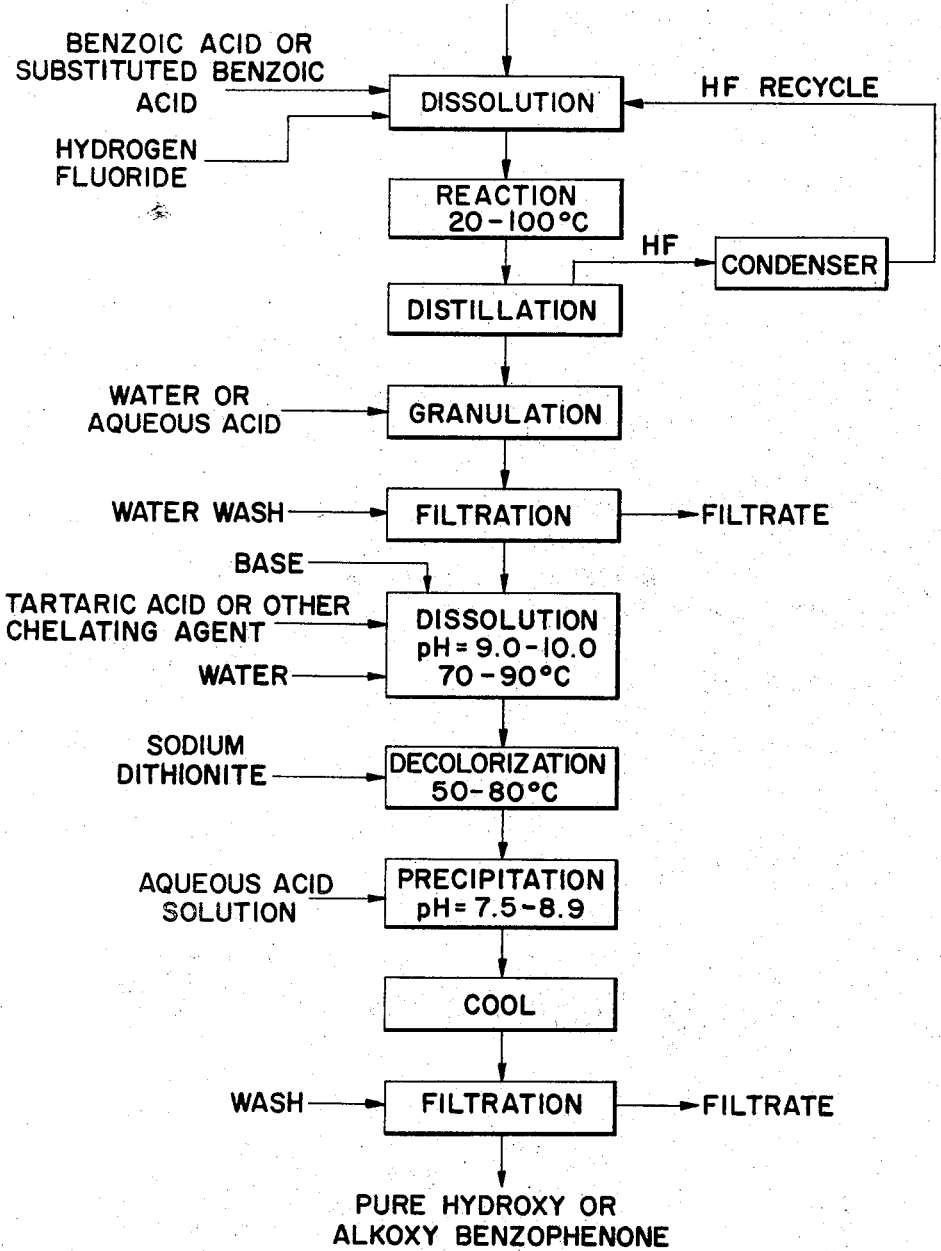

3,403,183
Patented Sept. 24, 1968

3,403,183
PRODUCTION OF BENZOPHENONES
Elmer H. Dobratz and Alfred J. Kolka, Pittsburgh, Pa., assignors to Koppers Company, Inc., a corporation of Delaware
Filed Dec. 16, 1966, Ser. No. 602,363
9 Claims. (Cl. 260—591)

ABSTRACT OF THE DISCLOSURE

Polyhydroxy and alkoxy benzophenones, such as 2,4-dihydroxybenzophenone, are prepared by condensing hydroxy or alkoxy substituted benzenes with benzoic acid or hydroxy or alkoxy derivatives thereof in the presence of a catalyst-solvent hydrogen fluoride system. The hydrogen fluoride is removed from the reaction mass and the residue treated in an alkaline solution at a pH of 9–10 with sodium dithionite. The pH of the solution is adjusted to 7.5 to 8.9 whereby pure and substantially undiscolored polyhydroxy or polyalkoxy benzophenones precipitate. Polyhydroxy or alkoxy substituted benzophenone compounds are use din the preparation of dyestuffs, resins, and ultraviolet light absorption agents, the last mentioned use requiring that these compounds be available in a pure and undiscolored form.

BACKGROUND OF THE INVENTION

Crude polyhydroxy or polyalkoxy substituted benzophenones can be prepared in the laboratory by various known processes, but the production of the benzophenones in commercially useful form is beseiged by problems of product contamination with by-products formed during the condensation reaction and by the decomposition of the product, causing such benzophenones to be virtually unavailable in a pure and undiscolored state.

A summary of the prior art relating to the preparation of various polyhydroxy benzophenones is given in "Derivatives of Benzoyl Resorcinol" J. Van Allen et al., Journal of Organic Chemistry, 19, 1243 (1954). Van Allen lists a number of the substituted benzophenone compounds and discusses their ultraviolet absorption characteristics, in addition to listing various reaction processes for their preparation. In the reference, the use of hydrogen fluoride condensations is discouraged because of the undesirable corrosive action of hydrogen fluoride and the necessity of pressure equipment in such a process.

The problems associated with hydrogen fluoride condensations have resulted in the use of other reaction media in the preparation of benzophenones. Such reactions have failed to give pure and undiscolored benzophenone compounds and extensive purification processes are necessary in order to meet commercial requirements. For example, 2,4-dihydroxybenzophenone, which is used primarily and extensively as an ultraviolet light absorption agent in polystyrene, must be in a undiscolored state to prevent discoloration of the stabilized polystyrene. Coloration in the 2,4-dihydroxybenzophenone will cause discoloration of the stabilized polymer and significantly limit its usefulness.

The extensive processing necessary for producing pure and undiscolored benzophenones is illustrated, for example, in Stanley et al. U.S. 2,682,559 and U.S. 2,921,-962. The former patent teaches a process for the purification of hydroxy benzophenones and describes the problems associated with the production of commercially acceptable pure and stable hydroxy benzophenones which are substantially undiscolored.

We have discovered a process whereby polyhydroxy or alkoxy substituted benzophenones are easily prepared from a disubstituted benzene compound and a benzoic acid through condensation in the presence of liquod hydrogen fluoride, followed by removal of the hydrogen fluoride, dissolution of the residual matter in a basic solution having a pH of 9 to 10 and reduction of impurities therein by the addition of sodium dithionite. The pH of the solution is then reduced to 7.5 to 8.9 to precipitate the highly purified and undiscolored substituted benzophenones. Our process is unique in that it obviates the use of any organic solvents throughout the reaction and decolorization and substantially all of the solvent-catalyst hydrogen fluoride is recovered for recycle.

SUMMARY OF THE INVENTION

Polyhydroxy or alkoxy benzophenones of the formula:

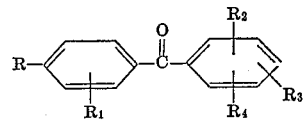

wherein R is selected from the group consisting of hydroxy or lower alkoxy; $R_1$ is selected from the group consisting of hydrogen and hydroxy, and lower alkoxy when R is lower alkoxy; $R_2$, $R_3$, and $R_4$ are selected from the group consisting of hydrogen, lower alkyl, hydroxy, and lower alkoxy; at least one of said R, $R_1$, $R_2$, $R_3$, and $R_4$ being hydroxy and at least two of said R, $R_1$, $R_2$, $R_3$, and $R_4$ being selected from the group consisting of hydroxy and lower alkoxy; and are prepared by forming a solution of (1) a hydroxy or alkoxy benzene of the formula:

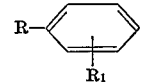

wherein R and $R_1$ are defined as above and $R_1$ is not in a position para- to R; (2) a benzoic acid of the formula

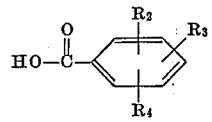

wherein $R_2$, $R_3$, and $R_4$ are defined as above; and (3) liquid anhydrous hydrogen fluoride, said hydrogen fluoride being present in an amount of 10—40 moles per mole of hydroxy or alkoxy substituted benzene compound. The solution is maintained at a temperature of 20–100° C., for a time sufficient to condense the hydroxy or alkoxy benzene and the benzoic acid. The hydrogen fluoride is then removed from the solution to leave a product residue. The product residue is contacted with water or a dilute aqueous solution of a mineral acid to form a slurry, the aqueous phase removed and a second aqueous slurry formed which is basified to a pH of 9 to 10 and heated to form a solution thereof. The basified solution is contacted with sodium dithionite and the resulting solution is heated for a period of time sufficient to reduce the impurities therein. Acid is then added to adjust the pH to 7.5 to 8.9, whereby the pure hydroxy or alkoxy benzophenones precipitate from the solution.

BRIEF DESCRIPTION OF THE DRAWING

The accompanying drawing, by flow-diagram, schematically illustrates the process herein described. The hydroxy or alkoxy substituted benzene compound, benzoic acid or substituted benzoic acid, and hydrogen fluoride are formed into a solution and reacted, preferably at 20–100° C. The hydrogen fluoride is removed by distillation from the reaction mass, for recycle in subsequent reactions, and the reaction mass is granulated by the addition of water or an aqueous acid solution. The acidic solution is preferably removed by filtration and the reaction mass dissolved in a basic solution having a pH of 9.0–10.0. At this point a suitable chelating agent may be added. The mixture is warmed to 70–90° C. to effect dissolution of the reaction mass and to this solution, at a temperature preferably between 50–80° C., sodium dithionite is added. The pH of the solution is adjusted to a pH of 7.5–8.9 by the addition of acid whereby the pure undiscolored hydroxy or alkoxy benzophenones are precipitated on cooling and removed by filtration or the like.

DETAILED DESCRIPTION

Illustrative of the compounds prepared according to the process of our invention are:

2,4-dihydroxybenzophenone:

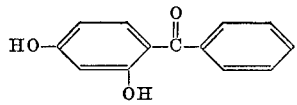

2-hydroxy-4-methoxybenzophenone:

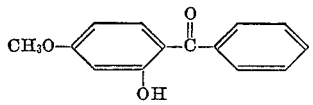

2,4,2′,4′-tetrahydroxybenzophenone:

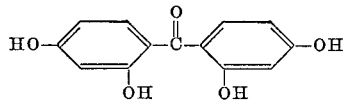

2,2′-dihydroxy-4,4-dimethoxybenzophenone:

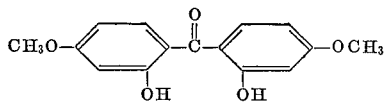

2,4,4′-trihydroxybenzophenone:

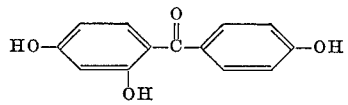

2,4,2′-trihydroxybenzophenone:

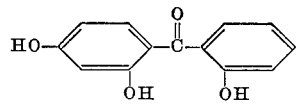

2,4,4′-trihydroxy-3′,5′-dimethylbenzophenone:

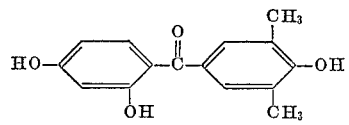

2-hydroxy-4′-methoxy-4′-methylbenzophenone:

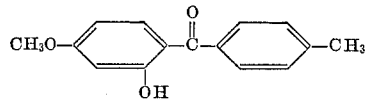

2,4-dihydroxy-4′-methoxy-3′,5′-dimethylbenzophenone:

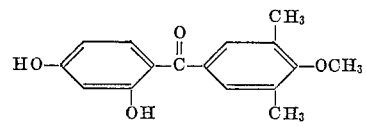

2,2′-dihydroxy-4,4′-diethoxybenzophenone:

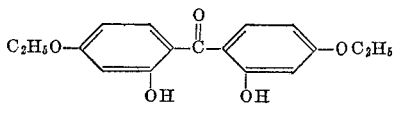

4,4′-dihydroxybenzophenone:

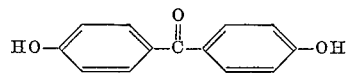

2,4′-dihydroxybenzophenone:

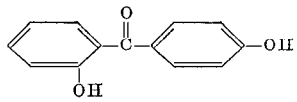

Examples of suitable hydroxy or alkoxy substituted benzene compounds useable in our process are:

phenol
anisole
phenetol
butoxybenzene
amoxybenzene
catechol
guaiacol
o-ethoxyphenol
o-propoxyphenol
o-butoxyphenol
o-amoxyphenol
resorcinol
m-methoxyphenol
m-ethoxyphenol
m-propoxyphenol
m-butoxyphenol
m-amoxyphenol Examples of suitable benzoic acids useable in our process are:

benzoic acid
salicyclic acid
m-hydroxybenzoic acid
p-hydroxybenzoic acid
o-methoxybenzoic acid
o-ethoxybenzoic acid
m-methoxybenzoic acid
m-ethoxybenzoic acid
anisic acid
p-ethoxybenzoic acid
2,3-dihydroxybenzoic acid
2,4-dihydroxybenzoic acid
2-hydroxy-4-methoxybenzoic acid
2-hydroxy-4-ethoxybenzoic acid
2-methoxy-4-hydroxybenzoic acid
2-hydroxy-3-methoxybenzoic acid
4-hydroxy-3,5-di-lower alkyl benzoic acids
  such as: 4-hydroxy-3,5-dimethylbenzoic acid
4-methoxy-3,5-di-lower alkyl benzoic acids
  such as: 4-methoxy-3,5-dimethylbenzoic acid
o-toluic acid
m-toluic acid
p-toluic acid
3,5-dimethylbenzoic acid The hydroxy or alkoxy substituted benzene and benzoic acid or substituted benzoic acid need only be admixed with the liquid hydrogen fluoride and solution of the reactants is easily obtained. The anhydrous hydrogen fluoride acts in a capacity of a solvent-catalyst for the reaction and is not consumed during the process. Most oxygenated organic compounds are highly soluble in hydrogen fluoride, making the use and recovery of other solvents unnecessary.

The hydrogen fluoride should be present in an amount of about 10 to 40 moles per mole of hydroxy or alkoxy substituted benzene compound. If lower amounts of hydrogen fluoride are used, the reaction mixture may not be in the form of a complete solution and the yield and conversion of the reactants are lowered. It is possible to use larger amounts of hydrogen fluoride, but as a practical matter, there is no benefit to using such amounts. We prefer to use hydrogen fluoride in an amount of about 15 to 30 moles per mole of hydroxy or alkoxy substituted benzene compound and have found that such amounts enable complete and easy dissolution of the reactants and provide the best reaction rates and yields.

Upon dissolving of the starting materials in the catalyst-solvent, the reaction mixture is then maintained at a temperature of 20 to 100° C. for a period of time which is sufficient to cause condensation of the reactants. The time necessary for the condensation is, of course, related to the temperature of the reaction, and we have found that at 20° C. or ambient temperature, merely allowing the solution to stand for a number of days will result in substantial yields. We prefer, however, to use temperatures in the order of 60–80° C., at which temperatures the reaction time necessary for conversion of the reactants is about 2 to 6 hours, which time is best suited for commercial purposes. When employing such elevated temperatures, it, of course, is necessary to maintain the reaction system in the liquid phase. The reaction, at elevated temperatures, is carried out in a closed vessel in which the vapor pressure maintains a liquid phase reaction. If desired, it is possible to employ an increased pressure on the system, such as by use of an inert gas.

After sufficient time has passed for the conversion of the starting materials into the desired substituted benzophenones, the hydrogen fluoride is removed from the reaction mixture. A convenient procedure for such removal is merely to distill off the hydrogen fluoride. The boiling point of the hydrogen fluoride is about 19.5° C.; therefore no large amount of heat is required for the distillation. The hydrogen fluoride, upon removal from the reaction mixture, can be recycled to subsequent condensation reactions.

Following the removal of the hydrogen fluoride, the resulting reaction mass, which may either be a concentrated solution or a slurry of the substituted benzophenone product in residual hydrogen fluoride, is granulated by contacting the mass with water or acidified water. A dilute mineral acid such as hydrochloric, sulfuric, and the like, in aqueous solution is used or water alone can be used for granulation. The dilute mineral acid solution effectively removes metallic ions that might be present in the product resulting from hydrogen fluoride attack upon any metallic reactor or reaction system.

The crude, discolored, condensation product may, if desired, be separated at this point in the reaction process. However, in order to produce polyhydroxy or polyalkoxy substituted benzophenones of high purity and in an undiscolored state, the following specific procedural steps constitute a necessary part of the process.

The dilute mineral acid washing of the granulated product residue is removed and the product residue is again slurried in an aqueous medium and treated with sodium dithionite.

As previously stated, the production of pure and undiscolored polyhydroxy and polyalkoxy benzophenones is extremely difficult and heretofore has necessitated the use of extensive processing.

We have found that, unexpectedly, the crude hydroxy or alkoxy benzophenones, when treated with sodium dithionite (sodium hydrosulfite) in aqueous alkaline solution under carefully controlled conditions, can be converted to an essentially colorless product with little reduction in over-all yield. The specificity of sodium dithionite in the discoloration is unique. Attempts to remove color by numerous other agents have been unsuccessful. Examples of the various unsuccessful attempts to obtain pure and undiscolored compounds are: carbon treatment in alkaline solution, digestion with hydrochloric acid, treatment with activated alumina, formic acid recrystallization, sulfur dioxide reduction, sodium bisulfite reduction, and others.

In this step of our process, the hydroxy or alkoxy benzophenones, prepared by the hydrogen fluoride catalyzed condensation, are contained in an aqueous slurry. At this point, it is helpful, but not necessary, to add a small amount of a chelating agent such as tartaric acid, ethylenediaminetetraacetic acid, or the like, in order to remove any metallic ions that might be remaining in the crude product.

To the aqueous slurry, there is added a base such as sodium hydroxide, sodium carbonate, sodium bicarbonate, or the like, to hold the pH of the solution at between 9 and 10. We have found that the pH of the aqueous solution of crude dihydroxy or dialkoxybenzophenones is critical. If the pH of the solution is permitted to fall outside this range, the colored bodies within the crude material will not be sufficiently reduced and the resulting product will not have the required high degree of purity.

The aqueous basic slurry is heated to a temperature of 70–90° C. in order to dissolve the crude product, initially present as a slurry, to give a dark amber solution. It is necessary that, before any sodium hydrosulfite is added to the reaction mixture, the crude product be dissolved. It is also necessary that the benzophenone compound contain at least one hydroxy or other solubilizing group in order that a solution can be obtained for sodium dithionite treatment.

After complete disolution of the crude product in the basic aqueous solution, the dark solution must then be cooled to a temperature of about 50–80° C. At this temperature, the sodium dithionite is added to the solution of crude product and an immediate color change begins to occur.

It is important that the crude product solution, after addition of the sodium dithionite, be kept below a temperature of about 80–85° C. or else the sodium dithionite itself will tend to decompose and contaminate the resulting product. The aqueous solution containing the sodium dithionite is then stirred at a temperature of about 50–80° C. and the color of the solution gradually changes from a dark to a very pale yellow solution.

After a sufficient time, visually determined by no further color change, the pale yellow solution is cooled and crystals of substituted benzophenone begin to come out of the solution. In order to get complete crystallization of the product, which is somewhat soluble in the aqueous solution, the pH of the solution is then adjusted to about 7.5 to 8.9 whereat substantially all of the pure substituted benzophenone is crystallized from the solution on further cooling.

The amount of sodium dithionite added should be greater than 0.5% of the weight of the solid being purified. Preferably, we use about 2–4 weight percent sodium dithionite. Larger amounts may be used, but show no advantage, while amounts less than 0.5% do not provide sufficient purification of the hydrogen fluoride condensation products.

The cooled solution is filtered, centrifuged, or the like, the solids water washed, and the white crystalline product thus obtained is dried. The product is of high purity and has very little color. This absence of color makes the product commercially valuable as an additive to clear rigid plastics.

The process can be carried out as a batch-wise process or as a continuous process, if desired.

Our invention is further illustrated by the following examples:

*Example I*

To a polyethylene bottle, there was added 55.1 grams (0.5 mole) of resorcinol (technical grade), 66.0 grams (0.54 mole) of benzoic acid and 170.1 grams (8.5 moles) of commercial anhydrous hydrogen fluoride. The mixture was swirled until a pale yellow solution was formed. The yellow solution was then added to a stainless steel autoclave which had been procooled. The autoclave and contents were heated to 75° C. during about 15 minutes and held at 75° C. for a period of 4 hours. Upon removing the heat source, the autoclave and contents were then cooled in an ice bath and the dark, red-yellow solution from the autoclave poured into a polyethylene container. The hydrogen fluoride was removed by distillation. There was then added, with stirring, dilute hydrochloric acid. Upon stirring, a finely granulated product precipitated which was filtered and washed with dilute acid and water to give a pale yellow-brown granular solid. This pale yellow-brown product was added to a one-liter flask equipped with stirrer and thermometer, addition funnel, and nitrogen flow. To the product there was added 3.8 grams of tartaric acid, 35 grams (0.33 mole) of sodium carbonate and 450 milliliters of water. The resulting slurry was stirred and heated to 90° C. to dissolve all the solids and give a dark brown solution, with the evolution of some $CO_2$ gas. The dark iodine-colored solution was cooled to 75° C., traces of crystals appearing on the sides of the flask, and 2.3 grams of sodium dithionite added. An immediate color change occurred to give a pale orange solution. The pale orange solution was stirred at 70–75° C. for a period of 0.5 hour with crystals forming and the solution continually changing from a pale orange to a pale light yellow color. After stirring at 75° C. for 0.5 hour, the light yellow solution was cooled to 45° C. and dilute sulfuric acid added by dropwise addition to pH of 8.46 (21.6 milliliters of 6.25 molar $H_2SO_4$). A fine crystalline white product results which was then filtered from the pale yellow solution and dried. The product was analyzed and found to be 99+% pure benzoyl resorcinol (2,4-dihydroxybenzophenone).

*Example II*

To an ice-cooled 300-milliliter stainless steel autoclave, equipped with a thermocouple and a vent-valve, there was added a solution containing 0.28 mole of phenol, 0.25 mole of p-hydroxybenzoic in 150 grams of cold liquid anhydrous hydrogen fluoride. After sealing, the autoclave was transferred to a preheated water-bath where the reaction temperature of 75° C. was reached in 20 minutes. After heating at 75° C. for 6 hours, the reaction was terminated by transferring the autoclave to an ice-bath. After the autoclave was thoroughly cooled, it was opened and its contents were transferred to a polypropylene bottle. Hydrogen fluoride was then distilled from the magnetically stirred crude product by heating it in a water-bath at 85–95° C. About 250 milliliters of water was then added to the solid residue which was warmed in the water-bath with agitation until the lumps disintegrated. After cooling, the water was removed and the granular solid washed acid-free with water. The product melted at 209–214° C. and was identified as 4,4'-dihydroxybenzophenone. The yield of the product at this point in the process was 94.8% based on p-hydroxybenzoic acid.

To a nitrogen-purged, agitated flask was charged the 50.5 grams (0.24 mole) of off-color 4,4'-dihydroxybenzophenone and 250 milliliters of water. To the mixture was added 1 gram of tartaric acid and 18 grams (0.17 mole) of sodium carbonate. The product dissolved completely at about 80° C. Upon addition of 1 gram of sodium dithionite the solution became a light lemon yellow. The dropwise addition of sulfuric acid to a pH of about 8.4 gave a granular precipitate of white product. After cooling to 35° C. the solid was removed by filtration and washed with water. Drying at 100° C. gave 47 grams of essentially white solid, melting at 217–219.5° C. The recovery was 93%. Acidification of the filtrate to pH 6.8 gave an additional 2.1 grams of light yellow product.

*Example III*

To illustrate the undiscoloration of the products produced by our process, the product of Example I was compared to a commercially available chemically pure sample of 2,4-dihydroxybenzophenone (Control). In the comparison, the color of the products were determined on solutions of 5 grams of the product in 50 ml. portions of 95% ethyl alcohol. The color determinations were made using a Fisher Model AC electrophotometer with a 425 B blue filter. The colors are reported as percent light transmission. The higher the value, the less discolored the compound. The results are given in Table I.

TABLE I

| Sample | Visual appearance | Color, percent transmission |
|---|---|---|
| Control | Yellowish | 31 |
| Example I | Almost white | 54.6 |

Thus, the process is found to produce undiscolored substituted benzophenones superior to commercially available chemically pure products.

*Example IV*

Using the process described in Example I, p-hydroxybenzoic acid and technical resorcinol were condensed to yield 2,4,4'-trihydroxybenzophenone. Resorcinol (0.3 mole) and p-hydroxybenzoic acid (0.25 mole) gave an 88.2% yield of the desired 2,4,4'-trihydroxybenzophenone. The product following purification as in Example I was almost colorless.

*Example V*

Solution of 25.3 grams (0.27 mole) of phenol and 30.7 grams (0.22 mole) of salicylic acid in 180 grams of anhydrous hydrogen fluoride was maintained at 70° C. for a period of 6 hours in a sealed autoclave. The hydrogen fluoride was removed by distillation and the residue slurried in 300 mil. of water, filtered and washed with water. The product, following treatment with sodium dithionite is a basic solution (pH 9) was identified by I. R. Spectograph as 2,4'-dihydroxybenzophenone. The melting point of the almost colorless product was 146–147° C.

*Example VI*

The preparation of pure 2-hydroxy-4-methoxybenzophenone is carried out according to Example I, using metamethoxyphenol and benzoic acid as starting materials.

*Example VII*

The condensation of B-resorcyclic acid and resorcinol generally according to Example I gives good yields of high purity 2,4,2',4'-tetrahydroxybenzophenone.

*Example VIII*

Phenetol is reacted with p-hydroxybenzoic acid in anhydrous hydrogen fluoride generally according to Example I to give pure 4-ethoxy-4'-hydroxybenzophenone.

*Example IX*

Resorcinol is condensed with salicylic acid in anhydrous hydrogen fluoride and the condensation product contacted with sodium dithionite in a basic solution of pH of 9 to give pure 2,4,2'-trihydroxybenzophenone.

*Example X*

The process of Example I was repeated up to the step of washing the pale yellow-brown solid with dilute acid and water. The pale yellow-brown solid was then added to a flask and 450 ml. of water added. To the slurry was added aqueous sodium hydroxide to a pH of 11.0. The addition of sodium dithionite to the basic solution, formed on heating, failed completely to remove the colored bodies present in the crude product, and the resultant product remained a yellow-brown color unsuitable for convenient application.

*Example XI*

To again illustrate the specificity of the pH value necessary before addition of the sodium dithionite, Example X was repeated using a pH of 7.0. The product which remained as a slurry on heating failed to decolorize on treatment with sodium dithionite and the resultant product was brown colored.

Example XII

The process of Example I was repeated except that sodium bisulfite, 3 grams, added in place of sodium dithionite. The resulting product was yellow.

Examples XIII through XIX

Variation of the hydroxy or alkoxy substituted benzene compound and the benzoic acid in the process gives the following pure and undiscolored polyhydroxy or polyalkoxy benzophenones.

(f) contacting said product residue with additional water to form a second slurry thereof;
(g) adjusting the pH of said second slurry to a pH of 9 to 10 and form an aqueous solution thereof;
(h) contacting said aqueous solution with sodium dithionite and heating said aqueous solution for a period of time sufficient to reduce impurities therein;
(i) adjusting the pH of said aqueous solution to a pH of 7.5 to 8.9 to precipitate the product; and
(j) separating the product therefrom.

TABLE II

| Example No. | Substituted benzene compound | Benzoic acid compound | Pure and undiscolored benzophenone compound |
|---|---|---|---|
| XIII | m-Methoxyphenol | Benzoic acid | 2-hydroxy-4-methoxybenzophenone. |
| XIV | do | 2-hydroxy-4-methoxybenzoic acid | 2,2'-dihydroxy-4,4'-dimethoxybenzophenone. |
| XV | m-Ethoxyphenol | 2-hydroxy-4-ethoxybenzoic acid | 2,2'-dihydroxy-4,4'-diethoxybenzophenone. |
| XVI | m-Methoxyphenol | 4-methylbenzoic acid | 2-hydroxy-4-methoxy-4'methylbenzophenone. |
| XVII | Catechol | Benzoic acid | 3,4-dihydroxybenzophenone. |
| XVIII | Butoxybenzene | 4-hydroxy-benzoic acid | 4-butoxy-4'-hydroxybenzophenone. |
| XIX | Anisole | p-Hydroxybenzoic acid | 4-methoxy-4'-hydroxybenzophenone. |

We claim:
1. Process for preparing substantially undiscolored benzophenones of the formula:

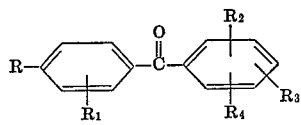

wherein
R is selected from the group consisting of hydroxy or lower alkoxy;
$R_1$ is selected from the group consisting of hydrogen and hydroxy, and lower alkoxy when R is lower alkoxy; and
$R_2$, $R_3$, $R_4$, are selected from the group consisting of hydrogen, lower alkyl, hydroxy and lower alkoxy; at least one of said R, $R_1$, $R_2$, $R_3$, $R_4$ is hydroxy, and at least two of said R, $R_1$, $R_2$, $R_3$, and $R_4$ being selected from the group consisting of hydroxy and lower alkoxy; comprising:
(a) forming a solution of (1) a compound of the formula:

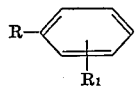

wherein R and $R_1$ are defined as above, and $R_1$ is in a position ortho- or meta- to R; (2) a benzoic acid of the formula:

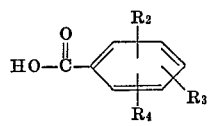

wherein $R_2$, $R_3$, and $R_4$ are defined as above; and (3) liquid anhydrous hydrogen fluoride, said hydrogen fluoride being present in an amount of 10–40 moles per mole of substituted benzene;
(b) maintaining said solution under autogenous or superatmospheric pressure, at a temperature of 20–100° C. for a time sufficient to condense said compound and said benzoic acid;
(c) removing the hydrogen fluoride from said solution to leave a product residue;
(d) contacting said product residue with water to form a slurry thereof and cause granulation of the product residue in said slurry;
(e) removing said water from said product residue;
(f) contacting said product residue with water to form a second slurry thereof;
(g) adjusting the pH of said second slurry to a pH of 9 to 10 and form an aqueous solution thereof;
(h) contacting said aqueous solution with sodium dithionite and heating said aqueous solution for a period of time sufficient to reduce impurities therein;
(i) adjusting the pH of said aqueous solution to a pH of 7.5 to 8.9 to precipitate the product; and
(j) separating the product therefrom.

2. The process of claim 1 wherein said benzophenone is 2,4-dihydroxybenzophenone.
3. The process of claim 1 wherein said benzophenone is 4,4'-dihydroxybenzophenone.
4. The process of claim 1 wherein said compound and said benzoic acid are present in about an equimolar ratio.
5. The process of claim 1 wherein said second slurry contains a minor amount of a chelating agent.
6. The process of claim 1 wherein said aqueous solution with sodium dithionite is heated to 50–80° C.
7. The process of claim 1 wherein said product residue is contacted with water containing a minor amount of acid to form said slurry.
8. The process of claim 1 wherein said sodium dithionite is present in an amount corresponding to 0.5–10 weight percent of the product residue in said aqueous solution.
9. Process for the preparation of substantially undiscolored 2,4-dihydroxybenzophenone comprising:
(a) forming a solution of resorcinol and benzoic acid, the mole ratio of benzoic acid to resorcinol being about 1:1, in liquid anhydrous hydrogen fluoride, the mole ratio of hydrogen fluoride to resorcinol being 10–40:1;
(b) maintaining said solution at autogenous or superatmospheric pressure, at a temperature of 20–100° C. for a predetermined time;
(c) removing hydrogen fluoride from said solution to leave a product residue;
(d) contacting said product residue with water to form a slurry thereof;
(e) removing said water from said product residue;
(f) contacting said product residue with water to form a second slurry thereof;
(g) adjusting the pH of said second slurry to a pH of 9–10 and forming an aqueous solution thereof;
(h) contacting said aqueous solution with sodium dithionite;
(i) adjusting the pH of said aqueous solution to a pH of 7.5 to 8.9 whereby purified 2,4-dihydroxybenzophenone precipitates therefrom and, separating pure 2,4-dihydroxybenzophenone therefrom.

References Cited

Simons et al., J. Am. Chem. Soc. 61, 1795–1796 (1939).
Chemical Abstracts, fifth decennial index, page 11628s (1947–1956).
Chemical Abstracts, sixth collective index, page 10750s (1957–1961).

DANIEL D. HORWITZ, *Primary Examiner.*